Jan. 14, 1969   J. F. MUELLER   3,421,435
FRENCH CUTTING DIE WITH REMOVABLE INSERT
Filed Jan. 9, 1967

INVENTOR
JOSEPH F. MUELLER
ATTORNEYS 3,421,435
FRENCH CUTTING DIE WITH
REMOVABLE INSERT
Joseph F. Mueller, Dedham, Mass.
(490 Centre St., Quincy, Mass. 02169)
Filed Jan. 9, 1967, Ser. No. 608,215
U.S. Cl. 101—28                                                  9 Claims
Int. Cl. B44b 5/02

ABSTRACT OF THE DISCLOSURE

A French cutting die has a cutting edge corresponding to the outline to be impressed surrounding a plastic insert bearing in relief the image desired to be embossed. There is a space between the plastic insert perimeter and the cutting edge, and the plastic insert is removable and replaceable so that a variety of textures may be embossed within the outline defined by the cutting edge.

Background of the invention

The present invention relates in general to French cutting dies and more particularly concerns a novel French cutting die with a removable insert that produces various designs and textures within the perimeter defined by the cutting edge. The invention thus facilitates embossing a number of different designs within a prescribed outline economically and easily.

Summary of the invention

According to the invention means define a cutting edge corresponding to the outline of a design desired to be embossed. Means define a removable insert within the outline defined by the cutting edge having a surface in relief that is displaced slightly from the plane defined by the cutting edge in a direction toward the base supporting the cutting edge defining means and the insert. There is a slight space between the cutting edge and insert.

Other features, objects and advantages of the invention will become apparent from the following specification when read with reference to the accompanying drawing in which:

Description of the preferred embodiment

Figure 1:
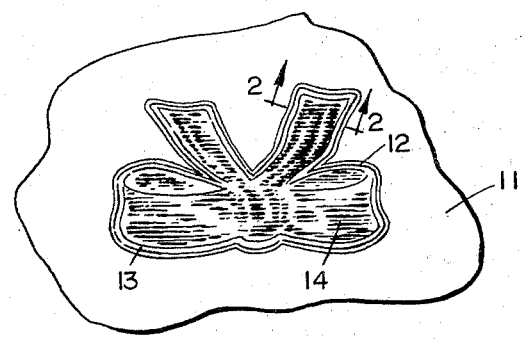
FIG. 1 shows a top view of a French cutting die with a removable insert according to the invention.
Figure 2:
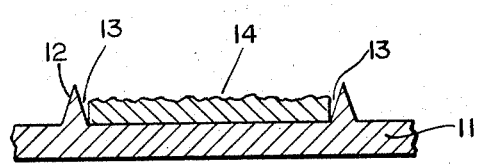
FIG. 2 is a sectional view through section 2—2 of FIG. 1.

With reference now to the drawing and more particularly FIG. 1 thereof, there is shown a top view of a French cutting die with removable insert according to the invention especially suitable for embossing an impression of a ribbon. A die base 11 supports a cutting edge 12 substantially corresponding to the perimeter or outline of the ribbon. As best seen in FIG. 2 there is a slight space 13 between the cutting edge 12 and the plastic insert 14. This space is typically of the order of 1/64 inch.

Insert 14 is typically made of Fiberglas or other suitable plastic material and carries an image in relief of a ribbon. Preferably, this image is formed by suitable known techniques and is not a part of the invention. The insert 14 may also be of metal, but plastic or Fiberglas is preferred because fabrication is easier and costs lower. A feature of the invention resides in the ability to change inserts and thereby the nature of the impressed ribbon.

The invention is especially advantageous when compared to a conventional one-piece metal French cutting die. Fabrication of the cutting edge and the desired internal image in relief is both difficult and costly in producing only a single image in relief within the area framed by the cutting edge. In contrast, the invention disclosed in this application includes a relatively easy and inexpensive cutting edge to fabricate that surrounds a relatively easy and inexpensive to fabricate insert that is replaceable to allow choice of many different surface impressions within the area framed by the cutting edge.

Still another feature of the invention resides in the ease with which the spacing between the plane of the cutting edge and the surrounded insert may be adjusted to facilitate embossing different character stocks with different impressions. This may be accomplished by appropriately controlling the thickness of the insert. Alternately, spacing means may be inserted between the insert and the base to control this spacing. In conventional one-piece dies, such adjustment requires making a new die, as a practical matter.

There has been described a novel French cutting die with a removable insert with numerous advantages. It is evident that those skilled in the art may now make numerous modifications and uses of and departures from the specific embodiment described herein without departing from the inventive concepts. Consequently, the invention is to be construed as embracing each and every novel feature and novel combination of features present in or possessed by the apparatus and techniques herein disclosed and limited solely by the spirit and scope of the appended claims.

The embodiments of the invention in which an exclusive property or privilege is claimed are defined as follows:

What is claimed is:
1. A French cutting die with a removable insert comprising,
   means defining a cutting edge corresponding to the outline of a designed desired to be embossed,
   means defining a base supporting and in fixed relationship with said cutting edge,
   and means defining a removable insert seated on said base within the outline defined by said cutting edge and having a surface in relief that is displaced slightly from the plane defined by said cutting edge in fixed relation therewith in a direction toward said base,
   the perimeter of said removable insert being slightly inside the outline defined by said cutting edge.
2. A French cutting die in accordance with claim 1 wherein the inside displacement of said perimeter from said outline is many times less than the distance across said outline.
3. A French cutting die in accordance with claim 2 wherein said inside displacement is substantially 1/64 inch.
4. A French cutting die in accordance with claim 1 wherein said cutting edge and base form a unitary metal structure.
5. A French cutting die in accordance with claim 4 wherein said insert is made of plastic material.
6. A French cutting die in accordance with claim 4 wherein the inside displacement of said perimeter from said outline is many times less than the distance across said outline.
7. A French cutting die in accordance with claim 6 wherein said inside displacement is substantially 1/64 inch.
8. A French cutting die in accordance with claim 5 wherein the inside displacement of said perimeter from said outline is many times less than the distance across said outline.

9. A French cutting die in accordance with claim 8 wherein said inside displacement is substantially 1/64 inch.

References Cited

UNITED STATES PATENTS

| | | | |
|---|---|---|---|
| 424,636 | 4/1890 | Anable | 101—28 |
| 734,762 | 7/1903 | Smith | 101—28 |
| 1,254,732 | 1/1918 | Rich | 101—28 |
| 1,752,107 | 3/1930 | Plater | 107—68 |
| 1,578,761 | 3/1926 | Rondolin | 107—68 |
| 2,403,916 | 7/1946 | Ferguson | 101—28 |
| 2,614,511 | 10/1952 | Neutelings | 107—68 |

ROBERT E. PULFREY, *Primary Examiner.*

J. R. FISHER, *Assistant Examiner.*